US012572199B2

(12) United States Patent (10) Patent No.: US 12,572,199 B2
Zhao et al. (45) Date of Patent: Mar. 10, 2026

(54) METHOD AND APPARATUS FOR GENERATING GROUP EYE MOVEMENT TRAJECTORY, COMPUTING DEVICE, AND STORAGE MEDIUM

(71) Applicant: KINGFAR INTERNATIONAL INC., Beijing (CN)

(72) Inventors: Qichao Zhao, Beijing (CN); Ran Yang, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 306 days.

(21) Appl. No.: 18/374,734

(22) Filed: Sep. 29, 2023

(65) Prior Publication Data

US 2024/0118747 A1 Apr. 11, 2024

(30) Foreign Application Priority Data

Oct. 11, 2022 (CN) .......................... 202211240379.4

(51) Int. Cl.
*G06F 3/01* (2006.01)
*G06F 3/04842* (2022.01)
(52) U.S. Cl.
CPC .......... *G06F 3/013* (2013.01); *G06F 3/04842* (2013.01)
(58) Field of Classification Search
CPC ..... G06F 3/013; G06F 3/04842; G06V 40/18; G06Q 30/0242
USPC ........................................................ 715/730
See application file for complete search history.

(56) References Cited

U.S. PATENT DOCUMENTS 6,712,468 B1 * 3/2004 Edwards ................. G06F 3/013
396/51
2010/0207877 A1 * 8/2010 Woodard ................ G06F 3/013
348/78

FOREIGN PATENT DOCUMENTS

CN 103500011 A 1/2014

OTHER PUBLICATIONS

Hoi Ying Tsang, et al. "ESeeTrack-Visualizing Sequential Fixation Patterns." IEEE Transactions on Visualization and Computer Graphics, vol. 16, No. 6, Nov. 2010, pp. 953-962, https://doi.org/10.1109/tvcg.2010.149. Accessed Sep. 21, 2022. (Year: 2010).*

(Continued)

*Primary Examiner* — Stephen S Hong
*Assistant Examiner* — Broderick C Anderson
(74) *Attorney, Agent, or Firm* — Cooper Legal Group, LLC

(57) ABSTRACT

The present application provides a method and apparatus for generating a group eye movement trajectory, a computing device, and a storage medium, belonging to the technical field of vision tracking. The method includes: acquiring eye movement data of each individual in a target group on a fixation object; generating an individual fixation trajectory of each individual on a plurality of areas of interest in the fixation object based on the eye movement data; and performing similarity fitting on the plurality of individual fixation trajectories to generate the group eye movement trajectory.

5 Claims, 10 Drawing Sheets

(56)     References Cited

OTHER PUBLICATIONS

Goldberg, Joseph H, and Jonathan I Helfman. Scanpath Clustering and Aggregation. Jan. 1, 2010, https://doi.org/10.1145/1743666. 1743721. Accessed Mar. 19, 2024. (Year: 2010).*

Long, et al.; "Eye-movement trajectory matching method: a new method to study the decision process"; Advances in Psychological Science 2020, vol. 28, No. 9, 1454-1461; 2020, Institute of Psychology, Chinese Academy of Sciences; https ://dx .doi .org /10. 3724/SP .J; 20 Pgs.

* cited by examiner

1

METHOD AND APPARATUS FOR GENERATING GROUP EYE MOVEMENT TRAJECTORY, COMPUTING DEVICE, AND STORAGE MEDIUM

CROSS-REFERENCE TO RELATED APPLICATION

The present application claims the priority benefits of China patent application No. 202211240379.4, filed on Oct. 11, 2022. The entirety of China patent application No. 202211240379.4 is hereby incorporated by reference herein and made a part of this specification.

TECHNICAL FIELD

The present application relates to the technical field of visual tracking, and in particular, to a method and apparatus for generating a group eye movement trajectory, a computing device, and a storage medium.

BACKGROUND

Eye movement tracking is a process of measuring eye movement, in which images are collected by an instrument and processed to locate the positions of the pupils and their coordinates, and then fixation points and gaze points of the eyes are calculated to form an eye movement trajectory, so as to infer a cognitive process of the brain according to the changes in eye movement. Eye movement tracking has become a method to analyze user behaviors in marketing, neuroscience, human-computer interaction, visual research, visual perception and visual search.

At present, methods commonly used for eye movement analysis generally include statistical evaluation, visual analysis, and AOI (Area Of Interest) quantitative analysis of the area of interest. In the prior art, an intelligent advertisement evaluation method and system based on eyeball trajectory tracking is provided, which includes: acquiring a set of eye movement data generated when a group of users are gazing at a standard advertisement object; performing association analysis on a set of standard key areas, a set of fixation points and a set of line-of-sight change data to construct a data relationship; and acquiring a standard evaluation result corresponding to the standard advertisement object according to the data relationship. In the prior art, based on subjective questionnaires in combination with eye movement trajectories, the characteristics of eye movement trajectories of different age groups are manually divided, so as to obtain visual behaviors of users in different groups. However, the above method cannot automatically identify the user's fixation sequence among different areas of interest during interaction with the human-machine interface, and the changes in the sequence among different areas of interest cannot be directly reflected.

SUMMARY

In order to directly reflect the changes in the fixation sequence of a group on different areas of interest, the present application provides a method and apparatus for generating a group eye movement trajectory, a computing device, and a storage medium, by which when different individuals are gazing at a same target, a group eye movement trajectory can be extracted from individual eye movement trajectories.

According to a first aspect of the present application, a method for generating a group eye movement trajectory is provided. The method includes: acquiring eye movement data of each individual in a target group on a fixation object; generating an individual fixation trajectory of each individual on a plurality of areas of interest in the fixation object based on the eye movement data; and performing similarity fitting on the plurality of individual fixation trajectories to generate the group eye movement trajectory.

According to the above technical solution, firstly, the eye movement data of each individual in a target group is acquired to obtain the individual fixation trajectory of each individual in the target group; then the individual fixation trajectories are filtered according to a preset rule to select a plurality of individual fixation trajectories which are representative for the group; and the selected individual fixation trajectories are fitted to obtain the group eye movement trajectory. In this way, a group eye movement trajectory can be generated from a plurality of individual fixation trajectories.

Optionally, in the above method, furthermore, the generated group eye movement trajectory may be displayed on a human-machine interface in real time.

Optionally, the eye movement data includes coordinate information of the fixation points and fixation time information of the individual on the fixation object. In the step of generating an individual fixation trajectory, the fixation object may be firstly divided into a plurality of areas of interest; then, a fixation time sequence and a fixation duration of each fixation point of the individual on the plurality of areas of interest are determined based on the fixation time information of the individual on the fixation object; and finally, the individual fixation trajectory is determined based on the coordinate information of the fixation points and the fixation time sequence and the fixation duration of each fixation point on the plurality of areas of interest.

According to the above technical solution, the fixation object is divided into a plurality of areas of interest; a plurality of eye movement fixation points on each area of interest may be obtained according to each set of eye movement data; one corresponding effective fixation point group is selected from the plurality of fixation points on each area of interest; and the effective fixation point groups of all the areas of interest are integrated, so as to obtain the individual fixation trajectory of each individual.

Optionally, according to the fixation time sequence of each fixation point on the plurality of areas of interest, whether the fixation duration of each fixation point on an area of interest is not less than a preset fixation duration threshold or not is sequentially determined, and if so, the fixation point is grouped into an effective fixation point group of the area of interest; and if not, go on to determine whether the fixation duration of a next fixation point is not less than the preset fixation duration threshold or not until all the fixation points are traversed; and the effective fixation point groups are sorted according to a fixation sequence based on coordinate information of the effective fixation point groups to obtain the individual fixation trajectory.

According to the above technical solution, the fixation sequence of each fixation point on a plurality of areas of interest is determined according to fixation time points; according to the fixation sequence on the areas of interest, whether the fixation duration of each fixation point is greater than a preset fixation duration threshold or not is sequentially determined, and if the fixation duration is greater than the preset fixation duration threshold, the fixation point is grouped into the effective fixation point group. As one effective fixation point group corresponds to one area of interest, the areas of interest are sorted by means of a group of selected effective fixation point groups according to the fixation sequence, and the fixation sequence of the area of interest is taken as the individual fixation trajectory.

Optionally, if the fixation durations of all the fixation points on an area of interest are less than a preset fixation duration, the area of interest does not have an effective fixation point group, and the area of interest is deleted.

Optionally, in the step of generating a group eye movement trajectory, pair-wise similarities are calculated for each individual fixation trajectory to obtain a similarity matrix $A=(a_{rc})_{M \times M}$, where $a_{rc}=a_{cr}$, $a_{rc}$ is a similarity between an r-th individual fixation trajectory and a c-th individual fixation trajectory, and M is a total quantity of the individual fixation trajectories; and a quantity of individual fixation trajectories corresponding to similarities not less than a preset similarity threshold in the similarity matrix are acquired; a consistency proportion of each individual fixation trajectory is obtained according to a ratio of a quantity of individual fixation trajectories corresponding to similarities not less than a preset similarity threshold to a total quantity of the individual fixation trajectories; the consistency proportions of all the individual fixation trajectories are sorted to obtain a maximum consistency proportion; and whether the maximum consistency proportion is greater than a preset fitting group threshold or not is determined, and if so, individual fixation trajectories corresponding to the maximum consistency proportion are selected, and if not, the similarity threshold is reset.

According to the above technical solution, pair-wise similarities for each individual fixation trajectory are compared with the preset similarity threshold; the quantity of individual fixation trajectories with similarities greater than the preset similarity threshold is obtained; then the consistency proportion is calculated according to the quantity of individual fixation trajectories with similarities greater than the preset similarity threshold; and the individual fixation trajectories corresponding to the maximum consistency proportion are selected, so that the selected eligible individual fixation trajectories are representative. If the maximum consistency proportion is less than the preset fitting group threshold, it indicates that the eligible individual fixation trajectories corresponding to the maximum consistency proportion cannot well represent the whole target group, and in this case, the preset maximum similarity may be reset to re-filter the individual fixation trajectory.

Optionally, a mean value of effective fixation point groups of a plurality of individual fixation trajectories corresponding to the maximum consistency proportion in a same area of interest is calculated to serve as a mean fixation point of the area of interest; and the group eye movement trajectory is obtained based on the mean fixation point of each area of interest.

According to the above technical solution, a group of effective fixation point groups corresponding to the selected individual fixation trajectories are obtained; a mean fixation point of the group of effective fixation point groups for each area of interest is calculated; and the areas of interest are sorted according to the mean fixation points, so as to obtain the group eye movement trajectory.

In a second aspect, the present application provides an apparatus for generating a group eye movement trajectory. The apparatus includes an acquisition module, a first generating module and a second generating module. The acquisition module is configured to acquire eye movement data of each individual in a target group on a fixation object. The first generating module is configured to generate an individual fixation trajectory of each individual on a plurality of areas of interest in the fixation object based on the eye movement data. The second generating module is configured to perform similarity fitting on the plurality of individual fixation trajectories to generate the group eye movement trajectory.

In a third aspect, the present application provides a computing device including a memory, a processor and a computer program stored on the memory. The computer program is executable by the processor to cause the processor to perform the method for generating a group eye movement trajectory as described in the first aspect.

In a fourth aspect, the present application provides a computer-readable storage medium including a computer program stored thereon. The computer program is to be loaded by a processor to perform the method for generating a group eye movement trajectory as described in the first aspect.

According to the above technical solution, the fixation trajectory of each individual in the target group is generated based on the acquired eye movement data; then the fixation points are filtered according to the fixation durations of the fixation points on a plurality of areas of interest in the fixation object to obtain a group of effective fixation point groups corresponding to each area of interest; the individual fixation trajectories corresponding to the maximum consistency proportion are selected according to the similarities between the plurality of individual fixation trajectories; and the mean fixation point of each area of interest is obtained by averaging the group of selected effective fixation point groups in the same area of interest, to obtain the group eye movement trajectory. According to the solution, changes in the fixation sequence of a group on different areas of interest in a fixation object can be directly reflected, and when different individuals are gazing at a same target, a group eye movement trajectory can be extracted from individual eye movement trajectories.

DETAILED DESCRIPTION

Exemplary embodiments of the present application will be described in more detail below with reference to the accompanying drawings. While the drawings show exemplary embodiments of the present application, it should be understood that the present application may be embodied in various forms and should not be construed as limited to the embodiments set forth herein. Rather, these embodiments are provided to provide a more thorough and complete understanding of the present application, and will fully convey the scope of the present application to those skilled in the art.

In the process that a user browses or gazes at a target object, there may be a certain sequence, indicating a certain browsing trajectory. However, when different individuals are gazing at a same target, their browsing characteristics may be influenced by age, gender, cultural background and other factors, and different eye movement trajectories are therefore formed. In order to solve the problem that when different individuals are gazing at a same target, a group eye movement trajectory cannot be directly extracted from individual eye movement trajectories, and it is not convenient to study the characteristics of eye movement of a group, the technical solution of the present application provides a method for generating a group eye movement trajectory, in which eye movement data of a user is recorded by an eye tracker, and individual eye movement trajectories are analyzed to obtain a eye movement trajectory of the target group. In this way, changes in the fixation sequence of a group on different areas of interest in a target object can be directly reflected, thereby improving the accuracy and efficiency of identification of eye movement characteristics of the group.

Figure 1:
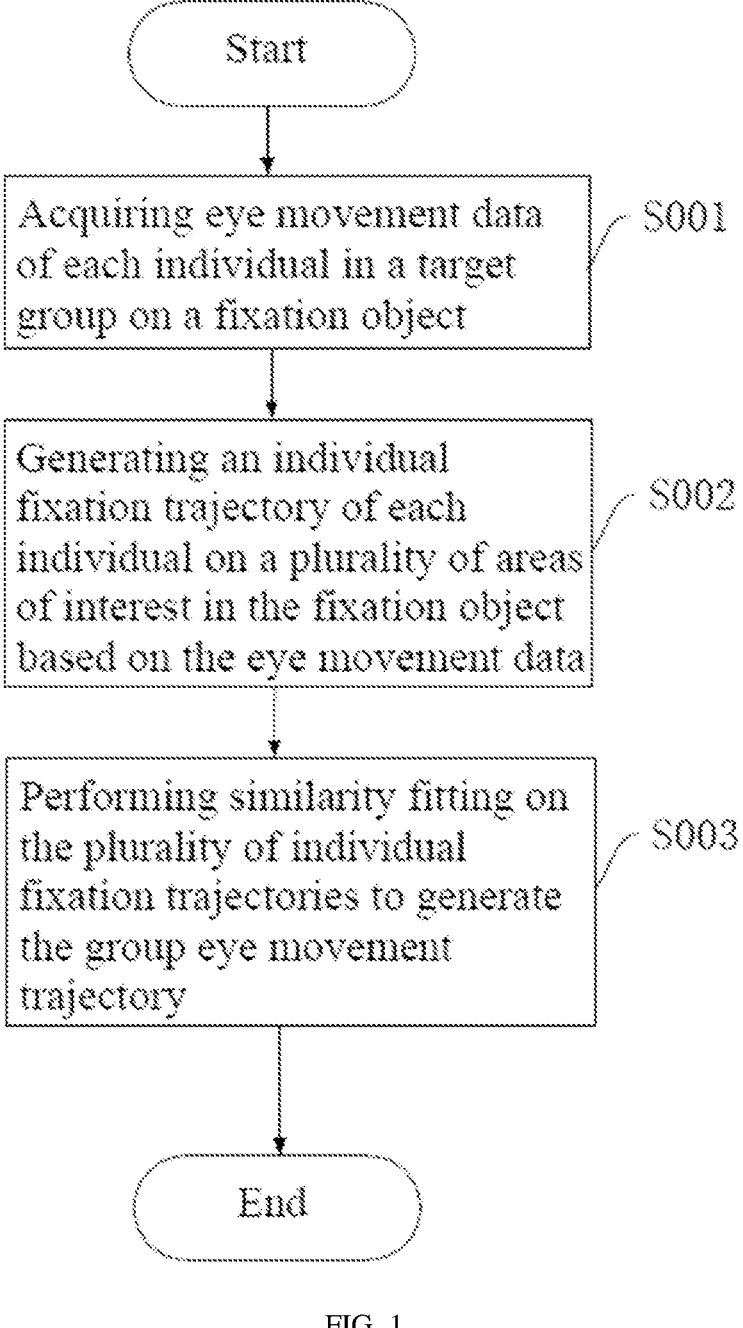
FIG. 1 shows a schematic flowchart of a method 01 for generating a group eye movement trajectory according to an embodiment of the present application.

FIG. 1 shows a schematic flowchart of a method 01 for generating a group eye movement trajectory according to an embodiment of the present application. As shown in FIG. 1, the method 01 starts from step S001, in which eye movement data of each individual in a target group on a fixation object is acquired.

The target group may be customized according to group attributes, including gender, age, cultural background and other dimensions, and may be selected in a single dimension or interactively selected in a plurality of dimensions. For example, the target group may be selected in two dimensions of age and gender as males aged 30-40 years old, or may be selected in a single dimension of cultural background as a population with a bachelor's degree or above. The fixation object may be a content displayed in a human-computer interaction interface, for example, a static or dynamic picture, such as a website, a television program, a teletext page, a software interface, etc.

Each individual in the target group corresponds to a piece of eye movement data. Eye movement data of each individual in the target group on a same fixation object may be collected by an eye tracker or other devices. When eye movement data is recorded, the eye tracker may collect original eye movement data according to a preset sampling rate (30 Hz, 60 Hz, 120 Hz, etc.), including coordinate information of fixation points and fixation duration information of the individual on the fixation object, that is, the eye movement data is a group of trajectories formed by a plurality of original fixation points. Each data point is identified as a time label or coordinates, and an eye movement data file in the EDF format is obtained. In order to facilitate the analysis of the eye movement data, the file may be converted into the ASC format, which is easy to open with text or Word. In an embodiment of the present application, the eye movement data may be visualized, and may be viewed in a mode of a spatial position overlay view, a time map view, an animation playback view, etc. The type of eye movement events to be displayed may be specified, including fixations, saccades, blinks, sampling points, etc., and a fixation heat map is directly generated according to the fixation durations of each individual on different areas of the fixation object.

Thereafter, step S002 is performed, in which an individual fixation trajectory of each individual on a plurality of areas of interest in the fixation object based on the eye movement data is generated.

Particularly, step S002 may include: dividing the fixation object into a plurality of areas of interest; then determining a fixation time sequence and a fixation duration of each fixation point of the individual on the plurality of areas of interest based on the fixation time information of the individual on the fixation object; and finally determining the individual fixation trajectory based on the coordinate information of the fixation points and the fixation time sequence and the fixation duration of each fixation point on the plurality of areas of interest. That is to say, the individual fixation trajectory is a trajectory formed by representative fixation points selected from the original eye movement data, so that the quantity of fixation points is reduced, that is, the data processing amount is reduced, thereby improving the processing efficiency. For example, if a fixation point of less than 80 ms is detected, the fixation point is merged with a previous or subsequent fixation point within a distance of one character.

Figure 2:
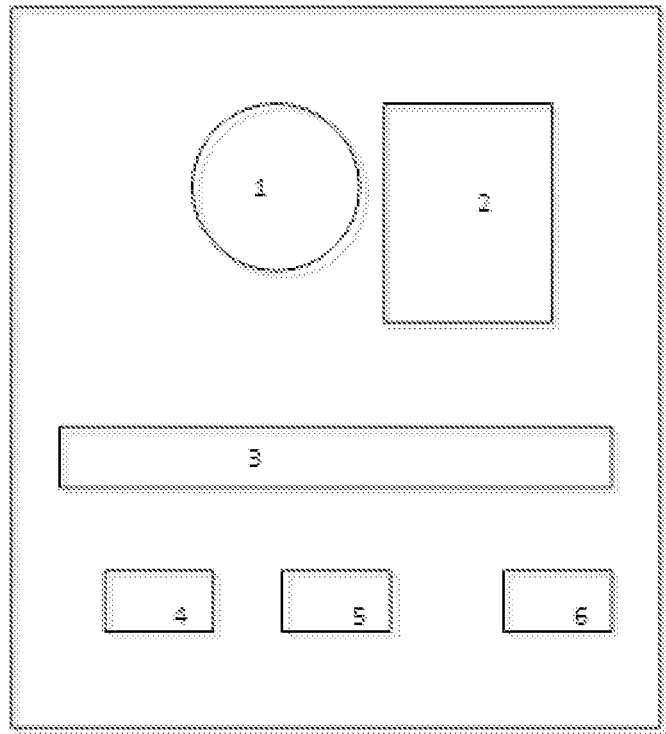
FIG. 2 shows a schematic diagram of the division of areas of interest of a fixation object according to an embodiment of the present application.

The areas of interest (AOI) may be automatically generated. For example, the areas of interest may be generated by equal division according to the size of the fixation object, or by manual division. For example, a text part is divided into one or more areas of interest, and an image part is divided into one or more areas of interest, etc., that is, the fixation object is specifically divided according to the attributes of the content of the fixation object, to perform targeted division on. FIG. 2 shows a schematic diagram of division of areas of interest of a fixation object according to an embodiment of the present application. As shown in FIG. 2, the fixation object, which is a picture, may be divided into a plurality of areas of interest numbered as 1, 2, 3, 4, 5, and 6. The areas of interest may be determined according to the research purpose of the experiment. For example, if the experimental material is a poster, a circle or rectangle may be drawn at the position of a key area of the poster, such as at the movie name, the release date, or other key information.

Figure 3:
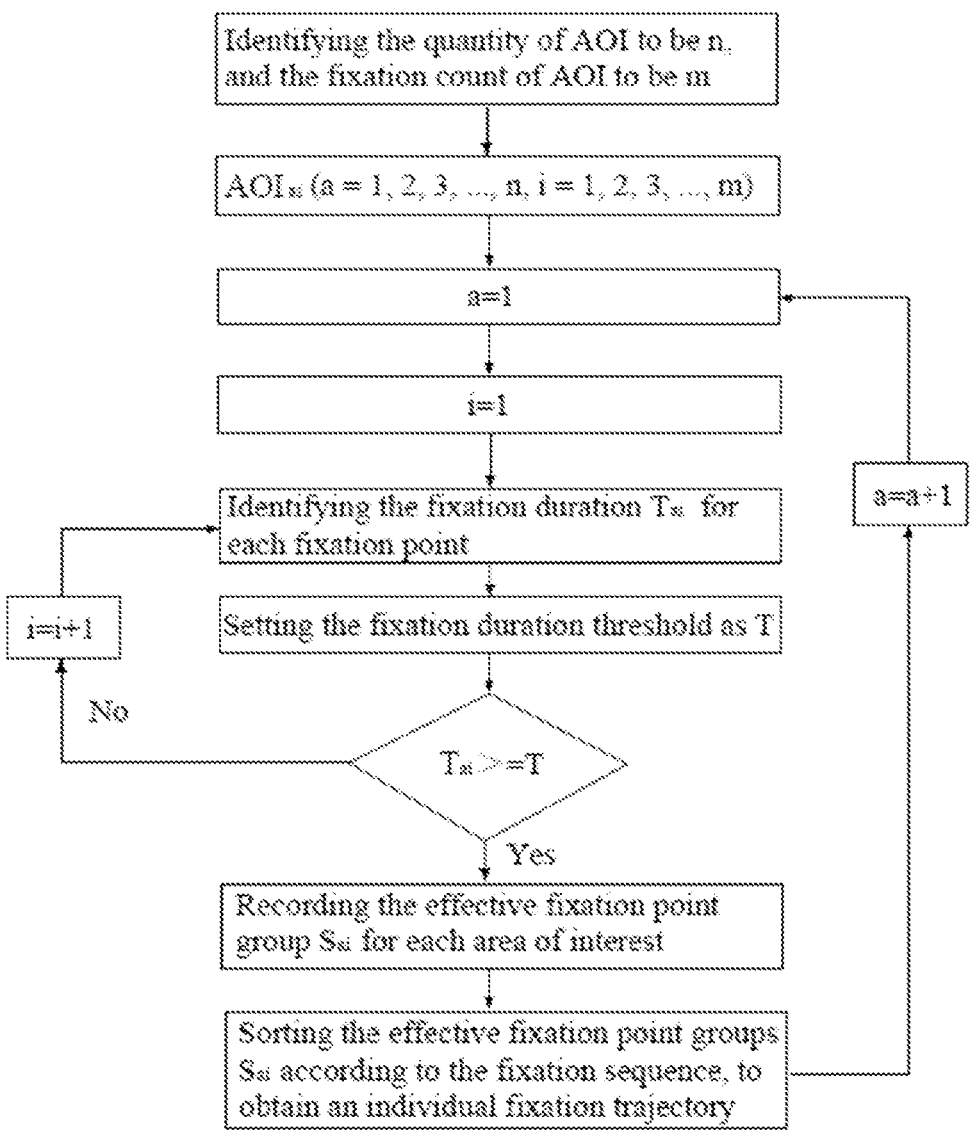
FIG. 3 shows a schematic flowchart of generating an individual fixation trajectory according to an embodiment of the present application.
Figure 4:
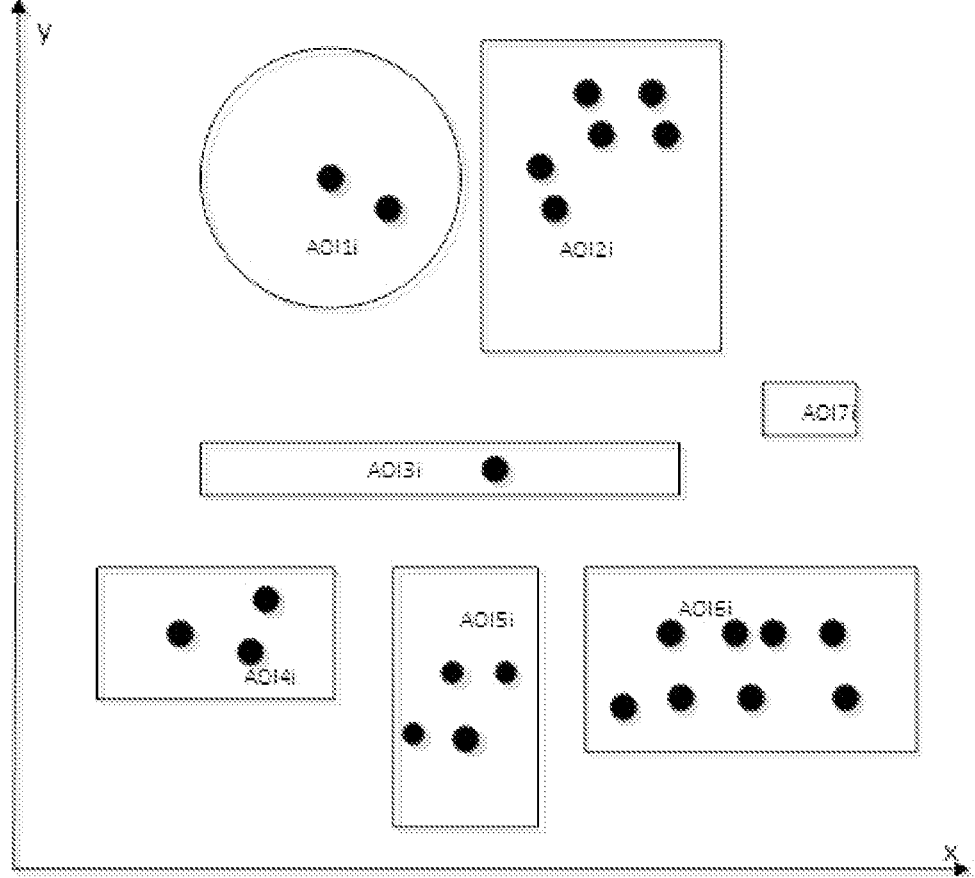
FIG. 4 shows a schematic diagram of fixation points corresponding to different areas of interest according to an embodiment of the present application.

The indexes of each area of interest include a fixation count (whether the AOI can be noticed and when the AOI can be noticed), a first fixation time point, an average fixation duration (the degree of interest of a subject to the AOI), a total fixation duration and a proportion of the fixation duration. The AOI indexes may be analyzed to filter the fixation points in each area of interest and select an effective fixation point group from the fixation points in each area of interest, and an effective fixation point group may include one or more effective fixation points. FIG. 3 shows a schematic flowchart of generating an individual fixation trajectory according to an embodiment of the present application. As shown in FIG. 3, firstly, a total quantity of the areas of interest (AOI) may be set as n, and the fixation count of each area of interest may be determined. The fixation count of the first area of interest may be set as m1, the fixation count of the second area of interest may be set as m2, and so on. Then, the areas of interest are numbered for the second time, and the areas of interest are numbered as AOI m (a=1, 2, 3, . . . , n, i=1, 2, 3, . . . , m (the value of m depends on the fixation counts of different areas of interest)). For example, the first area of interest is numbered as $AOI_{11}$, $AOI_{12}$, $AOI_{13}$ . . . the second area of interest is numbered as $AOI_{21}$, $AOI_{22}$, $AOI_{23}$ . . . $AOI_{2m2}$, and the initial values of a and i are set as 1. FIG. 4 shows a schematic diagram of fixation points corresponding to different areas of interest according to an embodiment of the present application. As shown in FIG. 4, the quantity of fixation points in each area of interest may be different, some with more fixation points, for example, the sixth area of interest, some with fewer fixation points, for example, the third area of interest, and some without fixation points, for example, the seventh area of interest.

Then, a first fixation point of the area of interest is determined according to the fixation time information of the fixation points within the area of interest, that is, the fixation point with the earliest fixation time point is the first fixation point of each area of interest. The fixation duration of each fixation point is determined according to the fixation time information of the fixation points within the area of interest. It should be understood that the fixation duration of each fixation point is a total length of time that the fixation point stays in the area of interest. Thereafter, the fixation duration threshold of the area of interest $AOI_{ai}$ is set as T. According to the sequence of fixation time points from early to late, for each area of interest, whether the fixation duration $T_{ai}$ of each fixation point on the area of interest is not less than (greater than or equal to) a preset fixation duration threshold T or not is determined, and if so, the corresponding fixation point is grouped into an effective fixation point group $S_{ai}$ of the area of interest; if not, go on to determine whether the fixation duration of a next fixation point in the area of interest is not less than a preset fixation duration threshold T or not, with the value i incremented until all the fixation points in the area of interest are traversed. Finally, each area of interest corresponds to an effective fixation point group $S_{ai}$. In particular, if there is no eligible fixation point in the area of interest, the area of interest is deleted. The effective fixation point group of each area of interest is identified according to the above method, that is, incrementing the value a, and finally the effective fixation point group corresponding to each area of interest is obtained. Finally, the effective fixation point groups corresponding to all the areas of interest are sorted according to the sequence of the fixation time points, to obtain the fixation sequence of the areas of interest, that is, to obtain an individual fixation trajectory.

Figure 5:
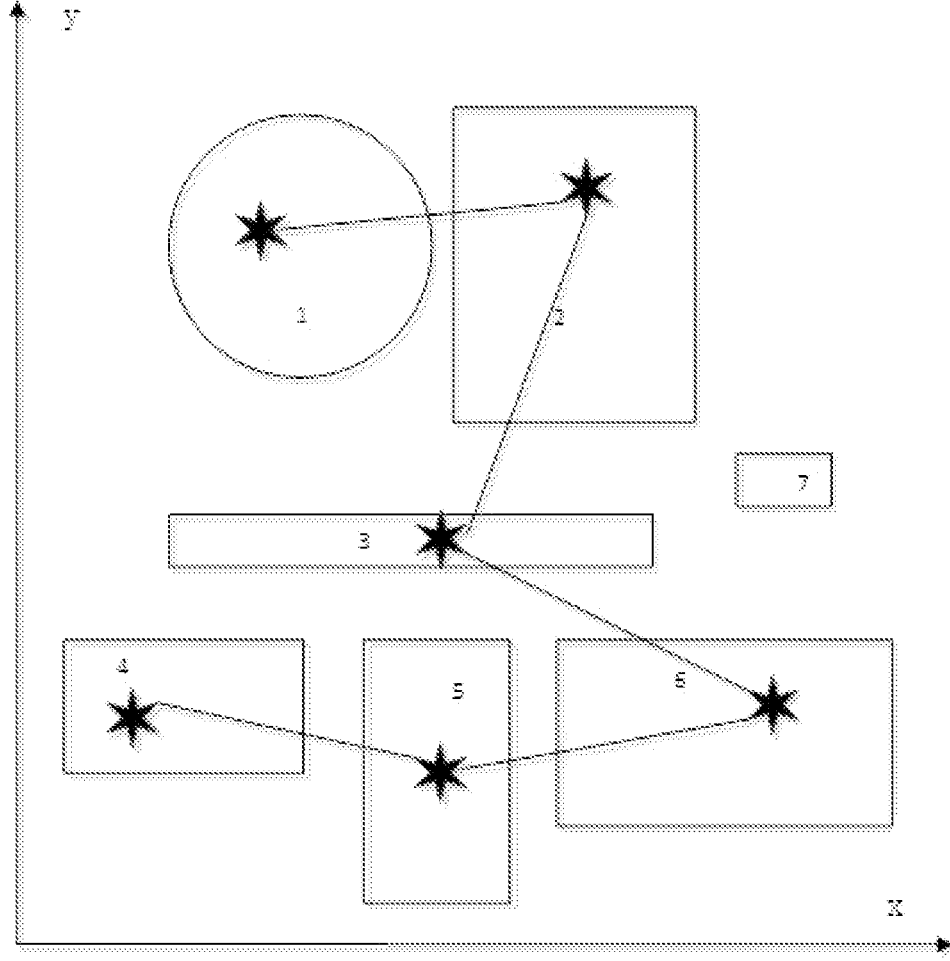
FIG. 5 shows a schematic diagram of an individual fixation trajectory according to an embodiment of the present application.

FIG. 5 shows a schematic diagram of an individual fixation trajectory according to an embodiment of the present application. As shown in FIG. 5, a star represents an effective fixation point group in an area of interest, and an effective fixation point group may contain a plurality of effective fixation points. By sorting and connecting the effective fixation point groups corresponding to all the areas of interest according to the sequence of the fixation time points, an individual fixation trajectory is obtained.

It should be understood that in the present embodiment, the first eye movement fixation point of each area of interest serves as the basis for sorting the areas of interest. In other embodiments, the total fixation duration of the area of interest, the first fixation duration of the area of interest, the fixation count of the area of interest, etc., may also serve as the basis for sorting the areas of interest, which is not limited herein.

Figure 6:
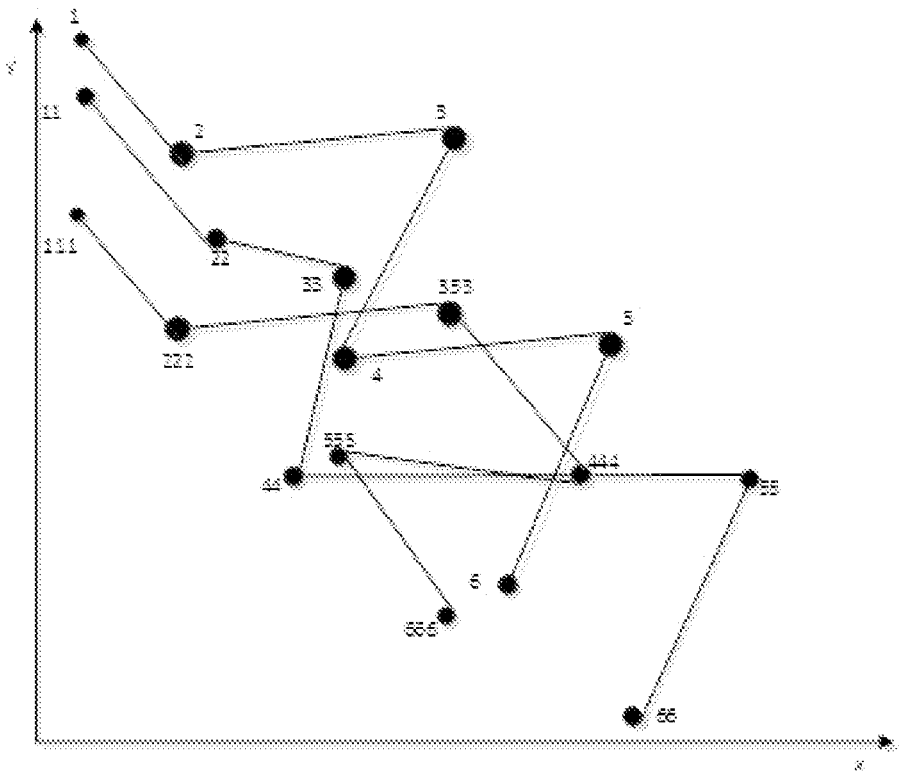
FIG. 6 shows a schematic diagram of individual fixation trajectories of a plurality of individuals in a target group according to an embodiment of the present application.

The step of generating an individual fixation trajectory as shown in FIG. 2 may be followed to obtain the individual fixation trajectory of each individual in the target group on the plurality of areas of interest in the fixation object. FIG. 6 shows a schematic diagram of individual fixation trajectories of a plurality of individuals in a target group according to an embodiment of the present application. As shown in FIG. 6, different individuals have different fixation trajectories. A first individual fixation trajectory is 1-2-3-4-5-6, a second individual fixation trajectory is 11-22-33-44-55-66, and a third individual fixation trajectory is 111-222-333-444-555-666. It should be noted that different individual fixation trajectories do not contain exactly the same areas of interest, nor do they necessarily contain all areas of interest. That is to say, the fixation sequences, the quantities of fixation areas of interest, and the selection of areas of interest in different individual fixation trajectories may vary. The finally obtained individual fixation trajectory is not a chaotic string of fixation points, but a sequence based on the effective fixation point groups corresponding to the areas of interest, whereby the complexity of data calculation is greatly reduced.

In the above embodiments, the fixation object is divided into a plurality of areas of interest; a group of effective fixation point groups of the areas of interest are selected according to the sequence of the fixation areas of interest and the visit durations of the fixation areas of interest; the areas of interest are sorted by the sequence numbers of the first eye movement fixation points in the group of selected effective fixation point groups; and the fixation sequence of the areas of interest is taken as the individual fixation trajectory. By means of selecting the effective fixation point group in each area of interest, the fixation sequence of each eye movement data may be accurately reflected, and the quantity of eye movement fixation points can be reduced, so that the calculation amount is therefore reduced.

Finally, step S003 is performed, in which similarity fitting is performed on the plurality of individual fixation trajectories to generate the group eye movement trajectory.

According to an embodiment of the present application, step S003 may particularly include: calculating pair-wise similarities for each individual fixation trajectory, that is, calculating the similarities between each individual fixation trajectory and other individual fixation trajectories in the target group to obtain a similarity matrix $A=(a_{rc})_{M \times M}$, where $s_{rc}=s_{cr}$, $s_{rc}$ is a similarity between an r-th individual fixation trajectory and a c-th individual fixation trajectory, M is a total quantity of the individual fixation trajectories, r=(1, 2, 3, . . . , M), and c=(1, 2, 3, M). Calculating a similarity is to compare two trajectories to obtain a similarity therebetween. The similarities may be calculated using one or more of the following algorithms: Euclidean distance, cosine Similarity, Mahalanobis distance, and Jaccard similarity dynamic time warping (DTW). Table 1 below shows calculation results of the similarity matrix according to an embodiment of the present application:

| | | Record 1 | Record 2 | Record 3 | Record 4 | Record 5 | Record 6 |
|---|---|---|---|---|---|---|---|
| c | Record 1 | 100% | 80% | 77% | 86% | 89% | 70% |
| | Record 2 | 80% | 100% | 90% | 87% | 60% | 70% |
| | Record 3 | 77% | 90% | 100% | 88% | 70% | 77% |
| | Record 4 | 86% | 87% | 88% | 100% | 79% | 80% |
| | Record 5 | 89% | 60% | 70% | 79% | 100% | 80% |
| | Record 6 | 70% | 70% | 77% | 80% | 80% | 100% |

As shown in Table 1 above, when r=c, $a_{rc}$ represents that the comparative individual fixation trajectory is the same fixation trajectory as the compared individual fixation trajectory, and $a_{rc}$=1. Then, according to the above six individual fixation trajectories, when M=6, a similarity matrix is obtained:

$$A = (a_{rc})_{6 \times 6} = \begin{bmatrix} 1 & 0.8 & 0.77 & 0.86 & 0.89 & 0.7 \\ 0.8 & 1 & 0.9 & 0.87 & 0.6 & 0.7 \\ 0.77 & 0.9 & 1 & 0.88 & 0.7 & 0.77 \\ 0.86 & 0.87 & 0.88 & 1 & 0.79 & 0.8 \\ 0.89 & 0.6 & 0.7 & 0.79 & 1 & 0.8 \\ 0.7 & 0.7 & 0.77 & 0.8 & 0.8 & 1 \end{bmatrix}$$

and then a quantity of individual fixation trajectories corresponding to similarities not less than a preset similarity threshold in the similarity matrix is acquired. Particularly, the similarity a rc obtained from each r-th record and each c-th record may be compared in sequence with a preset maximum similarity threshold T1, and records with similarities greater than or equal to the maximum similarity threshold may be selected. For each r, the number of reserved records is denoted by Br. For example, when r=1, $B_1$ is obtained, and $B_1$=(1, 2, . . . , x) (x<=A) represents the number of records that meet the filtering condition. Similarly, when r=2, $B_2$ represents the number of records that meet the filtering condition. In the example of the above figure, if T1=80% is set, $B_1$=4, $B_2$=4, $B_3$=3, $B_4$=5, $B_5$=3, $B_6$=3.

Thereafter, a consistency proportion of each individual fixation trajectory is obtained according to a ratio of a quantity of individual fixation trajectories corresponding to similarities not less than a preset similarity threshold to a total quantity of the individual fixation trajectories. Particularly, the consistency proportion of each individual fixation trajectory is set as Pr, where the consistency proportion Pr=the quantity B r of individual fixation trajectories with similarities greater than a preset similarity threshold/the total quantity M of individual fixation trajectories. When r=1, P1=4/6=80%. Similarly, P2=80%, P3=50%, P4=83.3%, P5=50%, P6=50%. If there is no individual fixation trajectory greater than the preset similarity threshold, the maximum similarity threshold T1 may be reset, or the fitting may be stopped.

Whether the maximum consistency proportion is greater than a preset fitting group threshold or not is determined, and if not, the similarity threshold is reset. In an embodiment, a fitting group threshold T2 may be set for Pr, and consistency proportions greater than T2 are selected, then the next step may be performed: the consistency proportions of all the individual fixation trajectories are sorted, and individual fixation trajectories corresponding to the maximum consistency proportion are selected. If the maximum consistency proportion is lower than the preset fitting group threshold, it indicates that the eligible individual fixation trajectory corresponding to the maximum consistency proportion cannot well represent the whole target group, and in this case, the maximum similarity threshold may be reset to re-filter the individual fixation trajectories.

The maximum consistency proportion represents the largest quantity of individual fixation trajectories with similarities greater than the preset similarity threshold, and the individual fixation trajectories are most representative in the target group.

In the step of filtering individual fixation trajectories as described above, the obtained individual fixation trajectories are compared to obtain the pair-wise similarities; individual fixation trajectories with similarities greater than the preset similarity threshold are selected from all the individual fixation trajectories; and then a group of most representative individual fixation trajectories are selected by calculating the consistency proportions.

Figure 7:
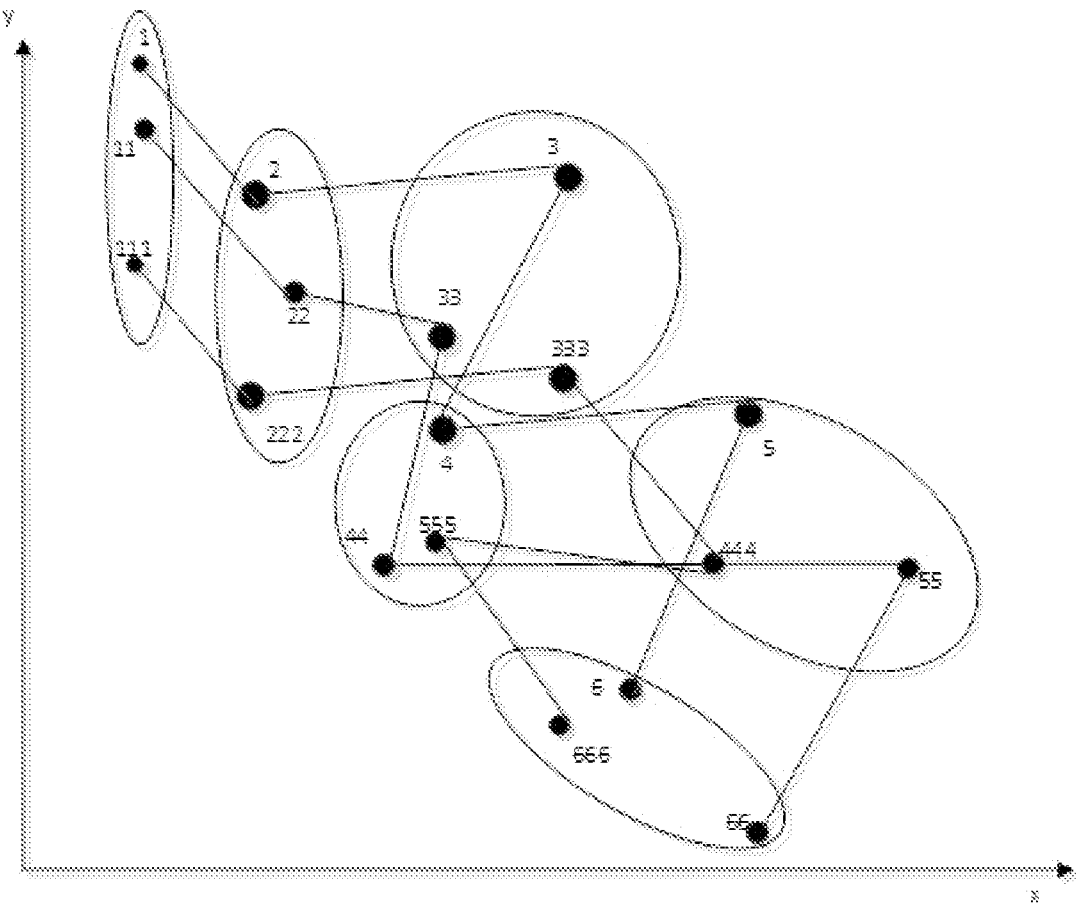
FIG. 7 shows a schematic diagram of calculating a mean fixation point of each area of interest according to an embodiment of the present application.

Finally, a mean value of effective fixation point groups of a plurality of individual fixation trajectories corresponding to the maximum consistency proportion in a same area of interest is calculated to serve as a mean fixation point of the area of interest; and the group eye movement trajectory is obtained based on the mean fixation point of each area of interest. For example, in the embodiment shown in Table 1, the maximum Pr is P4 (83.3%), and the selected records corresponding to P4 are Records 1, 2, 3, 4 and 6, then a mean value of effective fixation point groups of these five records in the same area of interest is calculated to serve as a mean fixation point of the area of interest. The mean fixation point=the sum of the effective fixation point groups of individual fixation trajectories corresponding to the maximum consistency proportion in the same area of interest/the quantity of individual fixation trajectories corresponding to the maximum consistency proportion. For example, $$AOIa = \frac{Sai \text{ of Record } 1 + Sai \text{ of Record } 2 + \ldots + Sai \text{ of Record } z}{z}$$

where AOIa represents a mean fixation point of an a-th area of interest, a=(1, 2, 3, . . . , n), Sai is an effective fixation point group in the a-th area of interest, and z is the quantity of the selected individual fixation trajectories. FIG. 7 shows a schematic diagram of calculating a mean fixation point of each area of interest according to an embodiment of the present application. As shown in FIG. 7, different individuals have different fixation sequences on areas of interest. When the mean fixation point is calculated, it is necessary to calculate the mean value of the effective fixation points in the same area of interest to obtain the mean fixation point corresponding to each area of interest.

In the embodiment of the present application, the maximum consistency proportion P4 corresponds to a first individual fixation trajectory, a second individual fixation trajectory, a third individual fixation trajectory, a fourth individual fixation trajectory and a sixth individual fixation trajectory, and a mean value of effective fixation point groups of the five individual fixation trajectories in the same area of interest is calculated to serve as a mean fixation point of the area of interest, and finally each area of interest corresponds to a mean fixation point. The trajectory of the mean fixation points corresponding on a plurality of areas of interest in the fixation object is a group eye movement trajectory.

Figure 8:
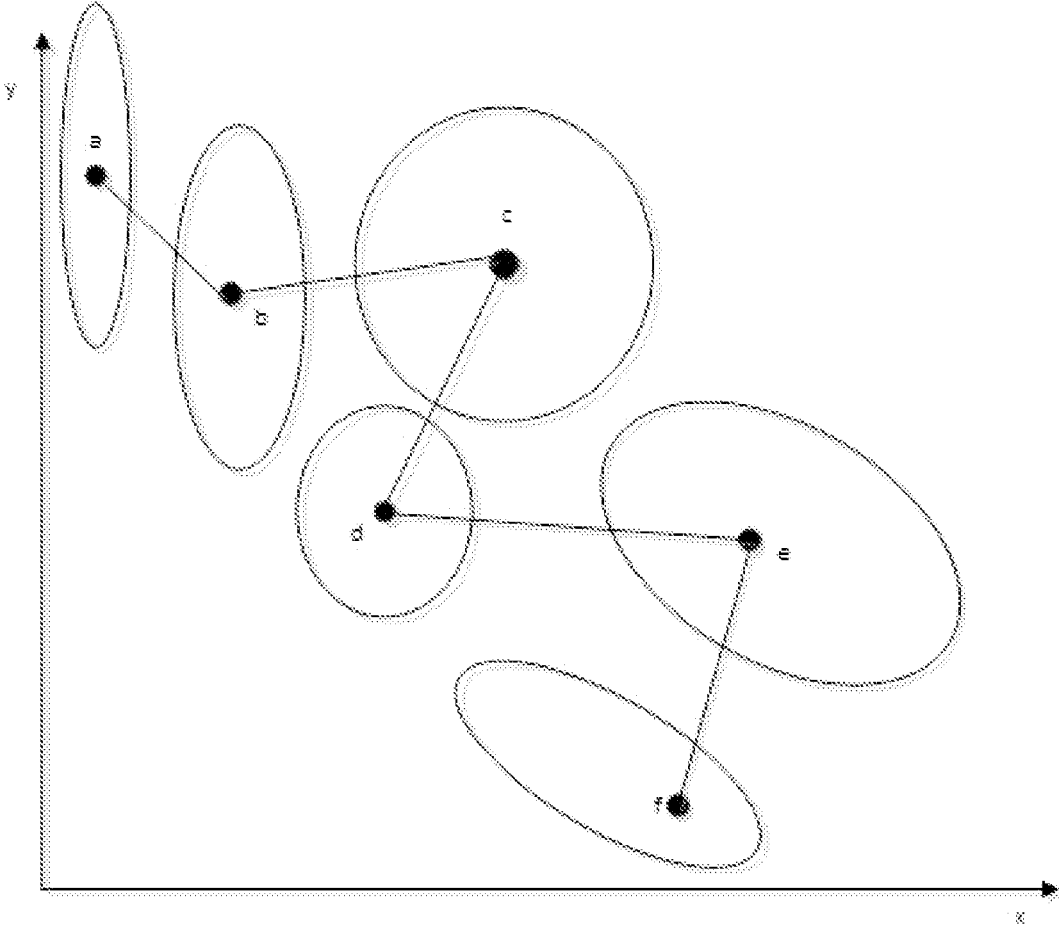
FIG. 8 shows a schematic diagram of a group eye movement trajectory according to an embodiment of the present application.

In the above embodiment, the effective fixation point groups of a plurality of selected individual fixation trajectories corresponding to the maximum consistency proportion in the same area of interest are acquired; a mean value of the plurality of effective fixation point groups in each area of interest is calculated, and the mean value is a mean fixation point of the area of interest; the mean fixation point of each area of interest is calculated using the above method; and all the mean fixation points are sorted according to a fixation time sequence, so as to obtain a group eye movement trajectory. FIG. 8 shows a schematic diagram of a group eye movement trajectory according to an embodiment of the present application. As shown in FIG. 8, the group eye movement trajectory is a connected trajectory a-b-c-d-e-f of the mean fixation point in each area of interest.

As a further embodiment of the method for generating a group eye movement trajectory, the method further includes: displaying the generated group eye movement trajectory on a human-machine interface in real time. The human-machine interface is a user interface or a customer interface, which is convenient for direct observation of the group eye movement trajectory.

According to the method for generating a visual group eye movement trajectory provided by the present application, eye movement data of each individual in a target group is acquired, and an individual fixation trajectory of each individual on a plurality of areas of interest in the fixation object is generated, whereby the quantity of original fixation points in the eye movement data is reduced, and the calculation amount and complexity in subsequent calculation of the group eye movement trajectory are reduced; then the individual fixation trajectories are filtered based on similarity fitting, and representative individual fixation trajectories are selected for averaging; and finally a group eye movement trajectory is generated and displayed on a human-machine interface in real time. In this way, changes in the fixation sequence of a group on different areas of interest in a fixation object can be directly reflected, and when different individuals are gazing at a same target, a group eye movement trajectory can be extracted from individual eye movement trajectories.

Figure 9:
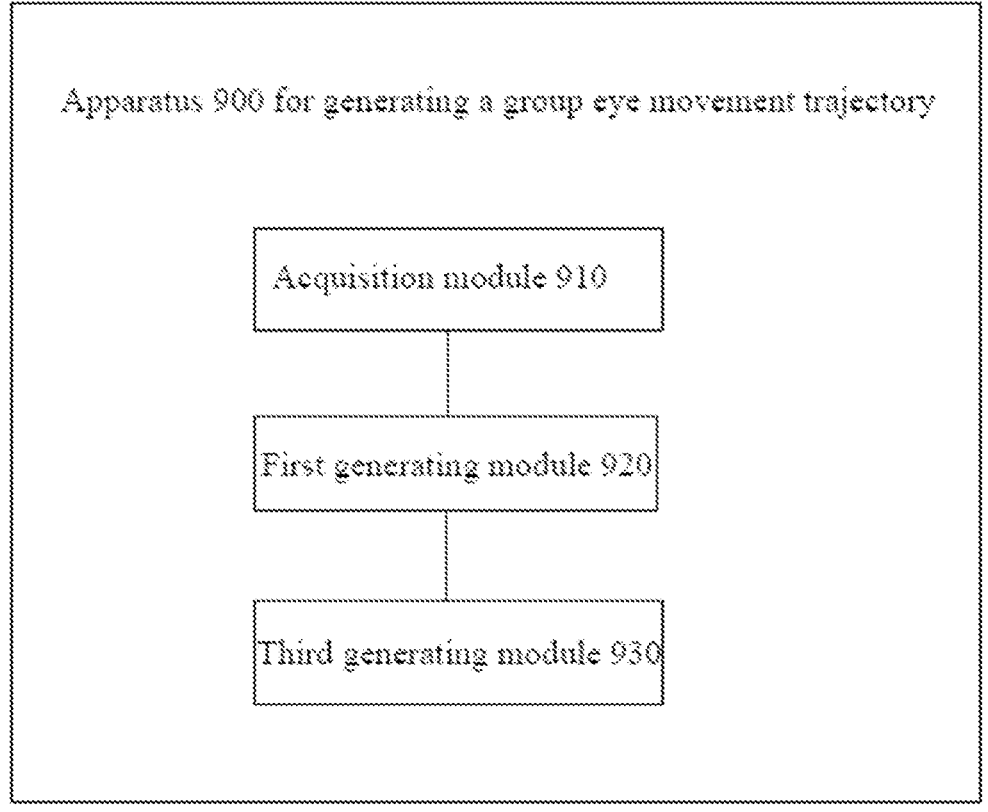
FIG. 9 shows a schematic structural diagram of an apparatus 900 for generating a group eye movement trajectory according to an embodiment of the present application.

An embodiment of the present application further discloses an apparatus for generating a group eye movement trajectory. FIG. 9 shows a schematic structural diagram of an apparatus 900 for generating a group eye movement trajectory according to an embodiment of the present application. As shown in FIG. 9, the apparatus 900 includes: an acquisition module 910, a first generating module 920 and a second generating module 930. The acquisition module 910 may acquire eye movement data of each individual in a target group on a fixation object; the first generating module 920 may generate an individual fixation trajectory of each individual on a plurality of areas of interest in the fixation object based on the eye movement data; and the second generating module 930 may perform similarity fitting on the plurality of individual fixation trajectories to generate the group eye movement trajectory.

The apparatus for generating a group eye movement trajectory provided in the present application can perform the method for generating a group eye movement trajectory described above, and a particular working process of the apparatus for generating a group eye movement fixation point trajectory can refer to a corresponding process in the above method embodiment.

It should be noted that in the above embodiments, the description of each embodiment has its own emphasis, and parts of one embodiment which are not described in detail may be referred to the description of other embodiments.

Figure 10:
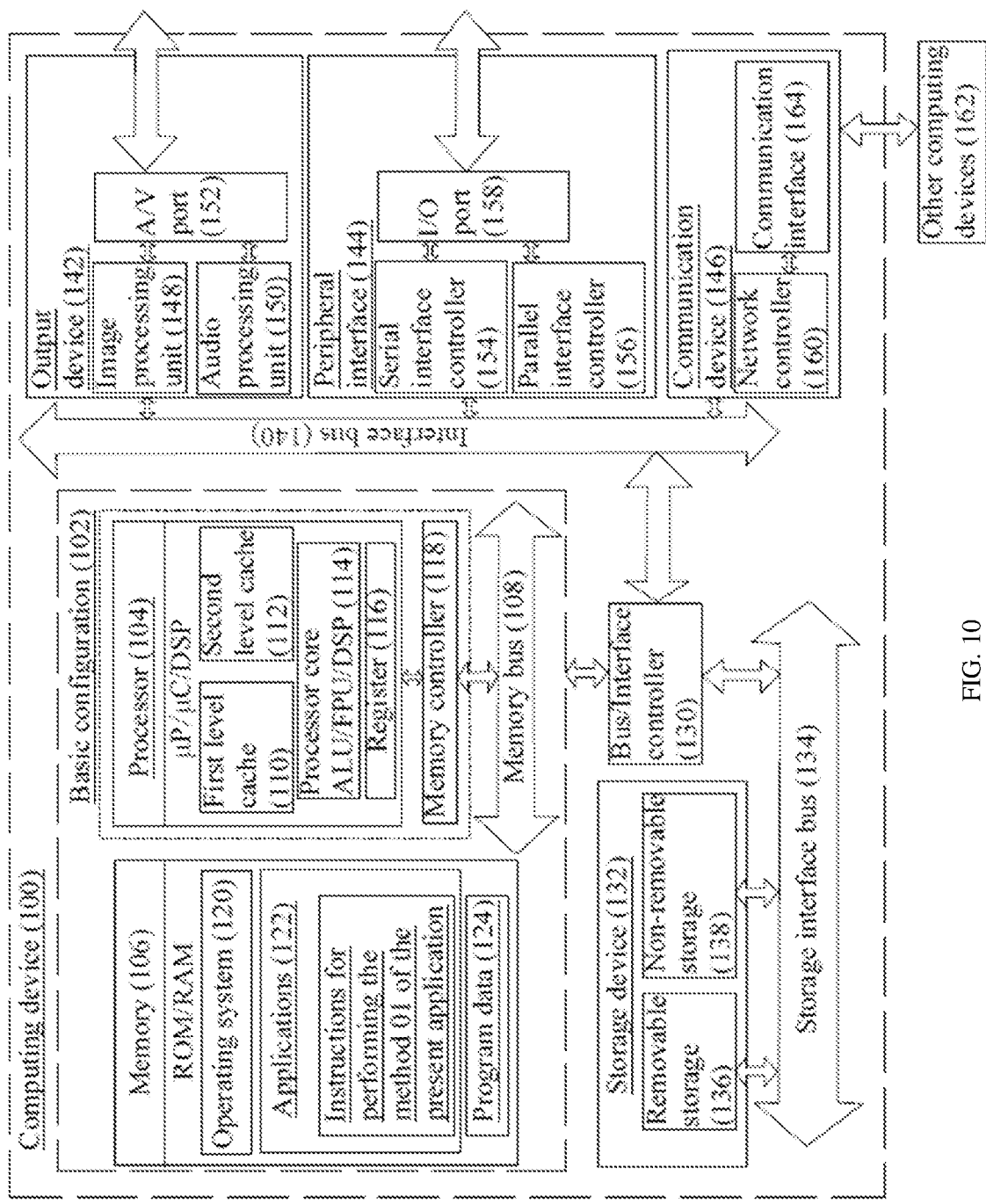
FIG. 10 shows a structural diagram of a computing device 100 according to an embodiment of the present application.

Based on the same technical concept, an embodiment of the present application discloses a computing device. FIG. 10 shows a structural diagram of a computing device 100 according to an embodiment of the present application. As shown in FIG. 10, in a basic configuration 102, the computing device 100 typically includes a memory 106 and one or more processors 104. A memory bus 108 may be used for communication between the processor 104 and the memory 106.

Depending on the desired configuration, the processor 104 may be a processor of any type, including but not limited to: a microprocessor (μP), a microcontroller (μC), a digital information processor (DSP), or any combination thereof. The processor 104 may include one or more levels of caches such as a first level cache 110 and a second level cache 112, a processor core 114, and registers 116. An exemplary processor core 114 may include an arithmetic logical unit (ALU), a float point unit (FPU), a digital signal processing (DSP) core, or any combination thereof. An exemplary memory controller 118 may be used with the processor 104, or in some implementations, the memory controller 118 may be an internal portion of the processor 104.

Depending on the desired configuration, the memory 106 may be a memory of any type, including but not limited to: a volatile memory (such as RAM), a non-volatile memory (such as ROM, flash memory, etc.), or any combination thereof. Physical memory in a computing device generally refers to a volatile memory RAM, and data in a disk needs to be loaded into the physical memory before it can be read by the processor 104. The memory 106 may include an operating system 120, one or more applications 122, and program data 124. In some embodiments, the applications 122 may be arranged to execute instructions on the operating system by one or more processors 104 using program data 124. The operating system 120 may be, for example, Linux, Windows, etc., which includes program instructions for handling basic system services and performing hardware-dependent tasks. The applications 122 include program instructions for implementing various user-desired functions, such as, but not limited to, browsers, instant messaging software, software development tools (such as integrated development environment (IDE), compilers, etc.), etc. When the applications 122 are installed on the computing device 100, a driver module may be added to the operating system 120.

When the computing device 100 starts running, processor 104 reads and executes the program instructions of the operating system 120 from the memory 106. The applications 122 run on the operating system 120 and implement various user-desired functions using interfaces provided by the operating system 120 and the underlying hardware. When a user starts the applications 122, the applications 122 are loaded into the memory 106 and the processor 104 reads and executes the program instructions of the applications 122 from the memory 106.

The computing device 100 also includes a storage device 132, which includes a removable storage 136 and a non-removable storage 138, both of which are connected to a storage interface bus 134.

The computing device 100 may also include an interface bus 140 that facilitates communication from various interface devices (such as an output device 142, a peripheral interface 144, and a communication device 146) to the basic configuration 102 via a bus/an interface controller 130. An exemplary output device 142 includes a graphics processing unit 148 and an audio processing unit 150. They may be configured to facilitate communication with various external devices, such as displays or speakers, via one or more A/V ports 152. An exemplary peripheral interface 144 may include a serial interface controller 154 and a parallel interface controller 156, which may be configured to facilitate communication with external devices, such as input devices (such as keyboards, mice, pens, voice input devices, touch input devices) or other peripheral devices (such as printers, scanners, etc.), via one or more I/O ports 158. An exemplary communication device 146 may include a network controller 160, which may be arranged to facilitate communication over a network communication link with one or more other computing devices 162 via one or more communication interfaces 164.

A network communication link may be an example of a communication medium. The communication medium may commonly be embodied as computer-readable instructions, data structures, and program modules in a modulated data signal such as a carrier wave or other transmission mechanism and may include any information delivery media. As a non-limiting example, the communication medium may include wired media such as a wired network or a dedicated network, and various wireless media such as acoustic, radio frequency (RF), microwave, infrared (IR), or other wireless media. The term computer-readable media as used herein may include both storage media and communication media. In the computing device 100 according to the present application, the applications 122 include instructions for performing the method 01 for generating a group eye movement trajectory of the present application.

An embodiment of the present application discloses a computer-readable storage medium.

The computer-readable storage medium includes a computer program stored thereon, and the computer program is to be loaded by a processor to perform the method for generating a visual group eye movement trajectory as described above.

The computer-readable storage medium may be any tangible medium containing or storing a program that may be used by or in connection with an instruction execution system, apparatus, or device; the program code embodied on a computer-readable medium may be transmitted over any suitable medium including, but not limited to, wireless, wire, fiber optic cable, RF, etc., or any suitable combination of the above.

According to the above solution, the fixation trajectory of each individual in the target group is generated based on the acquired eye movement data; then the fixation points are filtered according to the fixation durations of the fixation points on a plurality of areas of interest in the fixation object to obtain a group of effective fixation point groups corresponding to each area of interest; the individual fixation trajectories corresponding to the maximum consistency proportion are selected according to the similarities between the plurality of individual fixation trajectories; and the mean fixation point of each area of interest is obtained by averaging the group of selected effective fixation point groups in the same area of interest, so as to obtain the group eye movement trajectory. According to the solution, changes in the fixation sequence of a group on different areas of interest in a fixation object can be directly reflected, and when different individuals are gazing at a same target, a group eye movement trajectory can be extracted from individual eye movement trajectories.

A large number of specific details are illustrated in the description provided herein. However, it is understood that the embodiment of the present application may be practiced without these specific details. In some instances, well-known methods, structures and techniques are not shown in detail in order not to obscure the understanding of the description.

Similarly, it should be understood that in the above description of exemplary embodiments of the present application, various characteristics of the present application are sometimes grouped together in a single embodiment, figure, or description thereof for the purpose of streamlining the disclosure and aiding in the understanding of one or more of the various inventive aspects. However, the disclosed method should not be interpreted as reflecting an intention that, the claimed invention requires more characteristics than are expressly recited in each claim. Rather, as reflected in the claims below, the inventive aspects lie in less than all characteristics of a single foregoing disclosed embodiment. Thus, the claims following the Detailed Description are hereby expressly incorporated into the Detailed Description, with each claim itself as a separate embodiment of the present application.

Those skilled in the art will appreciate that the modules or units or components of the devices in the examples disclosed herein may be arranged in a device as described in the embodiments, or alternatively may be located in one or more devices other than the devices in the examples. The modules in the foregoing examples may be combined into one module or further divided into a plurality of sub-modules.

Those skilled in the art will appreciate that the modules in the devices in the embodiment may be adapted and arranged in one or more devices different from the embodiment. Modules or units or components in an embodiment may be combined into one module or unit or component, and further divided into a plurality of sub-modules or sub-units or sub-components. All of the characteristics disclosed in the description (including any appended claims, abstract and drawings), and all of the processes or units of any method or device so disclosed, may be combined in any combination, except combinations where at least some of such characteristics and/or processes or units are mutually exclusive. Each characteristic disclosed in the description (including any appended claims, abstract and drawings) may be replaced by alternative characteristics serving the same, equivalent or similar purpose, unless expressly stated otherwise.

Moreover, those skilled in the art will appreciate that although some embodiments described herein include some but not other characteristics included in other embodiments, combinations of characteristics of different embodiments are meant to be within the scope of the present application and form different embodiments. For example, in the following claims, any one of the claimed embodiments may be used in any combination.

Furthermore, some of the described embodiments are described herein as methods or combinations of method elements that may be implemented by a processor of a computer system or by other apparatuses for performing the described functions. Thus, a processor with the necessary instructions for implementing the method or method element forms the apparatus for implementing the method or method element. Furthermore, the elements of the apparatus embodiments described herein are examples of the following apparatuses: the apparatus serves to implement the functions performed by the elements for the purpose of implementing the present application.

As used herein, unless otherwise specified, the use of the ordinal numbers such as "first", "second", "third", etc., to describe a common object merely indicates that different instances of similar objects are being referred to, and is not intended to imply that the objects so described must have a given sequence, either temporally, spatially, in sorting, or in any other manner.

While the present application has been described with respect to a limited number of embodiments, those skilled in the art, having benefit of this description, will appreciate that other embodiments may be devised which fall within the scope of the present application as described herein. Furthermore, it should be noted that the language used in the description has been principally selected for readability and instructional purposes, and may not have been selected to illustrate or limit the subject matter of the present application. Accordingly, many modifications and variations will be apparent to one of ordinary skill in the art without departing from the scope and spirit of the appended claims. For the scope of the present application, the disclosure of the present application is illustrative rather than restrictive, the scope of the present application is limited by the appended claims.

What is claimed is:

1. A computer device, comprising a memory, a processor and a computer program stored on the memory, wherein the computer program is executable by the processor to cause the processor to perform a method for generating a group eye movement trajectory, comprising:

acquiring eye movement data of each individual in a target group on a fixation object, wherein the eye movement data comprises coordinate information of fixation points and fixation time information of the individual on the fixation object, and the target group is a group of individuals sharing one or more attributes;

generating an individual fixation trajectory of each individual on a plurality of areas of interest in the fixation object based on the eye movement data; and performing similarity fitting on the plurality of individual fixation trajectories to generate the group eye movement trajectory;

wherein the performing similarity fitting on the plurality of individual fixation trajectories to generate the group eye movement trajectory, comprises:

obtaining a consistency proportion of each individual fixation trajectory according to a ratio of a quantity of individual fixation trajectories corresponding to similarities not less than a preset similarity threshold to a total quantity of the individual fixation trajectories;

sorting the consistency proportions of all the individual fixation trajectories to obtain a maximum consistency proportion;

in response to the maximum consistency proportion being greater than a preset fitting group threshold, selecting individual fixation trajectories corresponding to the maximum consistency proportion; and in response to the maximum consistency proportion being less than or equal to the preset fitting group threshold, resetting the similarity threshold, wherein the performing similarity fitting on the plurality of individual fixation trajectories to generate the group eye movement trajectory, further comprises:

determining pair-wise similarities for each individual fixation trajectory;

acquiring the quantity of individual fixation trajectories corresponding to similarities not less than the preset similarity threshold, and wherein the performing similarity fitting on the plurality of individual fixation trajectories to generate the group eye movement trajectory, further comprises:

determining a mean value of effective fixation point groups of a plurality of individual fixation trajectories corresponding to the maximum consistency proportion in a same area of interest to serve as a mean fixation point of the area of interest; and obtaining the group eye movement trajectory based on the mean fixation point of each area of interest.

2. The computer device according to claim 1, further comprising:

displaying the group eye movement trajectory on a human-machine interface in real time.

3. The computer device according to claim 1, wherein the generating an individual fixation trajectory of each individual on a plurality of areas of interest in the fixation object based on the eye movement data, comprises:

dividing the fixation object into the plurality of areas of interest;

determining a fixation time sequence and a fixation duration of each fixation point of the individual on the plurality of areas of interest based on the fixation time information of the individual on the fixation object; and determining the individual fixation trajectory based on the coordinate information of the fixation points and the fixation time sequence and the fixation duration of each fixation point on the plurality of areas of interest.

4. The computer device according to claim 3, wherein the determining the individual fixation trajectory based on the coordinate information of the fixation points and the fixation time sequence and the fixation duration of each fixation point on the plurality of areas of interest, comprises:

according to the fixation time sequence of each fixation point on the plurality of areas of interest, sequentially determining whether the fixation duration of each fixation point on an area of interest is not less than a preset fixation duration threshold;

when the fixation duration of each fixation point on the area of interest is not less than the preset fixation duration threshold, grouping the fixation point into an effective fixation point group of the area of interest;

when the fixation duration of each fixation point on the area of interest is less than the preset fixation duration threshold, going on to determine whether the fixation duration of a next fixation point is not less than the preset fixation duration threshold until all the fixation points are traversed; and sorting the effective fixation point groups according to a fixation sequence based on coordinate information of the effective fixation point groups to obtain the individual fixation trajectory.

5. The computer device according to claim 4, wherein the determining the individual fixation trajectory based on the coordinate information of the fixation points and the fixation time sequence and the fixation duration of each fixation point on the plurality of areas of interest, comprises:

when the fixation durations of all the fixation points on the area of interest are less than the preset fixation duration, determining that the area of interest does not have an effective fixation point group, and deleting the area of interest.

* * * * *